(12) United States Patent
Wu et al.

(10) Patent No.: US 12,265,468 B2
(45) Date of Patent: Apr. 1, 2025

(54) METHOD AND APPARATUS FOR PERFORMING ACCESS MANAGEMENT OF MEMORY DEVICE IN PREDETERMINED COMMUNICATIONS ARCHITECTURE WITH AID OF AUTOMATIC PARAMETER SETTING

(71) Applicant: Silicon Motion, Inc., Hsinchu County (TW)

(72) Inventors: Lu-Ting Wu, Taichung (TW);
Shen-Ting Chiu, Miaoli County (TW);
Te-Kai Wang, Hsinchu County (TW);
Po-Lin Wu, Hsinchu (TW)

(73) Assignee: Silicon Motion, Inc., Hsinchu County (TW)

(*) Notice: Subject to any disclaimer, the term of this patent is extended or adjusted under 35 U.S.C. 154(b) by 0 days.

(21) Appl. No.: 18/241,996

(22) Filed: Sep. 4, 2023

(65) Prior Publication Data
US 2024/0232067 A1    Jul. 11, 2024

Related U.S. Application Data

(60) Provisional application No. 63/437,618, filed on Jan. 6, 2023.

(51) Int. Cl.
*G06F 12/00*     (2006.01)
*G06F 12/02*     (2006.01)
*G06F 12/1009*   (2016.01)

(52) U.S. Cl.
CPC ...... *G06F 12/0238* (2013.01); *G06F 12/1009* (2013.01); *G06F 2212/7203* (2013.01)

(58) Field of Classification Search
CPC .... G06F 12/0238; G06F 3/061; G06F 3/0634; G06F 3/0679; G06F 13/1668; G06F 12/0246; G06F 2212/7203
See application file for complete search history.

(56) References Cited

U.S. PATENT DOCUMENTS

2013/0124888 A1* 5/2013 Tanaka ................ G06F 12/0246
                                                     713/320
2014/0281119 A1* 9/2014 Hyun .................. G06F 12/0646
                                                     711/102

(Continued)

FOREIGN PATENT DOCUMENTS

TW        200741729        11/2007
WO        2022/193270 A1    9/2022

*Primary Examiner* — John A Lane
(74) *Attorney, Agent, or Firm* — Winston Hsu

(57) ABSTRACT

A method for performing access management of a memory device in a predetermined communications architecture with aid of automatic parameter setting and associated apparatus are provided. The method includes: utilizing the memory controller to set at least one write booster static parameter of a write booster function of the memory device; utilizing the memory controller to perform device initialization corresponding to at least one initialization phase of the memory device; and after completing the device initialization corresponding to the at least one initialization phase, performing at least one adaptive flag-setting operation, for setting at least one write booster flag among a plurality of write booster flags of the write booster function, wherein the at least one write booster flag includes a first write booster flag acting as a write booster switch. The adaptive flag-setting operation includes setting the first write booster flag to enable the write booster function by default.

13 Claims, 5 Drawing Sheets

(56) References Cited

U.S. PATENT DOCUMENTS

| | | | | |
|---|---|---|---|---|
| 2017/0344311 A1* | 11/2017 | Oh | ................. | G06F 3/0659 |
| 2023/0367514 A1* | 11/2023 | Wang | ................. | G06F 3/0655 |
| 2023/0376206 A1* | 11/2023 | Wang | ................. | G06F 3/061 |

* cited by examiner

METHOD AND APPARATUS FOR PERFORMING ACCESS MANAGEMENT OF MEMORY DEVICE IN PREDETERMINED COMMUNICATIONS ARCHITECTURE WITH AID OF AUTOMATIC PARAMETER SETTING

CROSS REFERENCE TO RELATED APPLICATIONS

This application claims the benefit of U.S. Provisional Application No. 63/437,618, filed on Jan. 6, 2023. The content of the application is incorporated herein by reference.

BACKGROUND OF THE INVENTION

1. Field of the Invention

The present invention is related to memory control, and more particularly, to a method and apparatus for performing access management of a memory device in a predetermined communications architecture with aid of automatic parameter setting.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. The memory device may be arranged to store various files such as system files, user files, etc. in a file system of a host. As some files may be very large, the user may need to wait for a long time when the host is trying to save these files in the file system. Some suggestions may be proposed to try solving the problem, but further problems such as some side effect may be introduced. Thus, a novel method and associated architecture are needed for solving the problems without introducing any side effect or in a way that is less likely to introduce a side effect.

SUMMARY OF THE INVENTION

It is an objective of the present invention to provide a method and apparatus for performing access management of a memory device in a predetermined communications architecture (e.g., a UFS communications architecture) with aid of automatic parameter setting, in order to solve the above-mentioned problems.

It is another objective of the present invention to provide a method and apparatus for performing access management of a memory device in a predetermined communications architecture (e.g., a UFS communications architecture) with aid of automatic parameter setting, in order to properly protect heterogeneous tables with table redundant array of independent disks (RAID) protection mechanism.

At least one embodiment of the present invention provides a method for performing access management of a memory device in a predetermined communications architecture with aid of automatic parameter setting, where the method can be applied to a memory controller of the memory device. The memory device may comprise the memory controller and a non-volatile (NV) memory, the NV memory may comprise at least one NV memory element (e.g., one or more NV memory elements), and the at least one NV memory element may comprise a plurality of blocks. The method may comprise: utilizing the memory controller to set at least one write booster static parameter of a write booster function of the memory device; utilizing the memory controller to perform device initialization corresponding to at least one initialization phase of the memory device; and after completing the device initialization corresponding to the at least one initialization phase, performing at least one adaptive flag-setting operation, for setting at least one write booster flag among a plurality of write booster flags of the write booster function, wherein the at least one write booster flag comprises a first write booster flag acting as a write booster switch of the write booster function. Additionally, the at least one adaptive flag-setting operation may comprise: setting the first write booster flag to enable the write booster function by default.

In addition to the above method, the present invention also provides a memory controller of a memory device, where the memory device comprises the memory controller and an NV memory. The NV memory may comprise at least one NV memory element (e.g., one or more NV memory elements), and the at least one NV memory element may comprise a plurality of blocks. In addition, the memory controller comprises a processing circuit that is arranged to control the memory controller according to a plurality of host commands from a host device, to allow the host device to access the NV memory through the memory controller, wherein the processing circuit is arranged to perform access management of the memory device in a predetermined communications architecture with aid of automatic parameter setting. For example, the memory controller sets at least one write booster static parameter of a write booster function of the memory device; the memory controller performs device initialization corresponding to at least one initialization phase of the memory device; and after completing the device initialization corresponding to the at least one initialization phase, the memory controller performs at least one adaptive flag-setting operation, for setting at least one write booster flag among a plurality of write booster flags of the write booster function, wherein the at least one write booster flag comprises a first write booster flag acting as a write booster switch of the write booster function. Additionally, the at least one adaptive flag-setting operation may comprise setting the first write booster flag to enable the write booster function by default.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the electronic device.

According to some embodiments, the memory device may store data for the host device, where updating some data among the stored data may be needed. In order to correct the related art problems, it is suggested that the memory device may operate according to at least one control scheme (e.g., one or more control schemes) of the method to perform associated operations, and more particularly, automatically adjust configurations regarding data reception, having no need to receive any associated command from the host device.

The present invention method and apparatus can guarantee that the memory device can operate properly in various situations. For example, when the host device does not conform to a newer version of a predetermined specification (e.g., UFS specification) and is not able to ask for adjusting some configurations regarding data reception, the memory device (e.g., the memory controller) may automatically adjust the configurations regarding data reception by itself, as if the host device conforms to the newer version of the predetermined specification, in order to utilize a predetermined type of blocks to perform data reception in a higher speed without being hindered by any incompatibility of the host device to the newer version of the predetermined specification, and therefore enhance overall performance. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
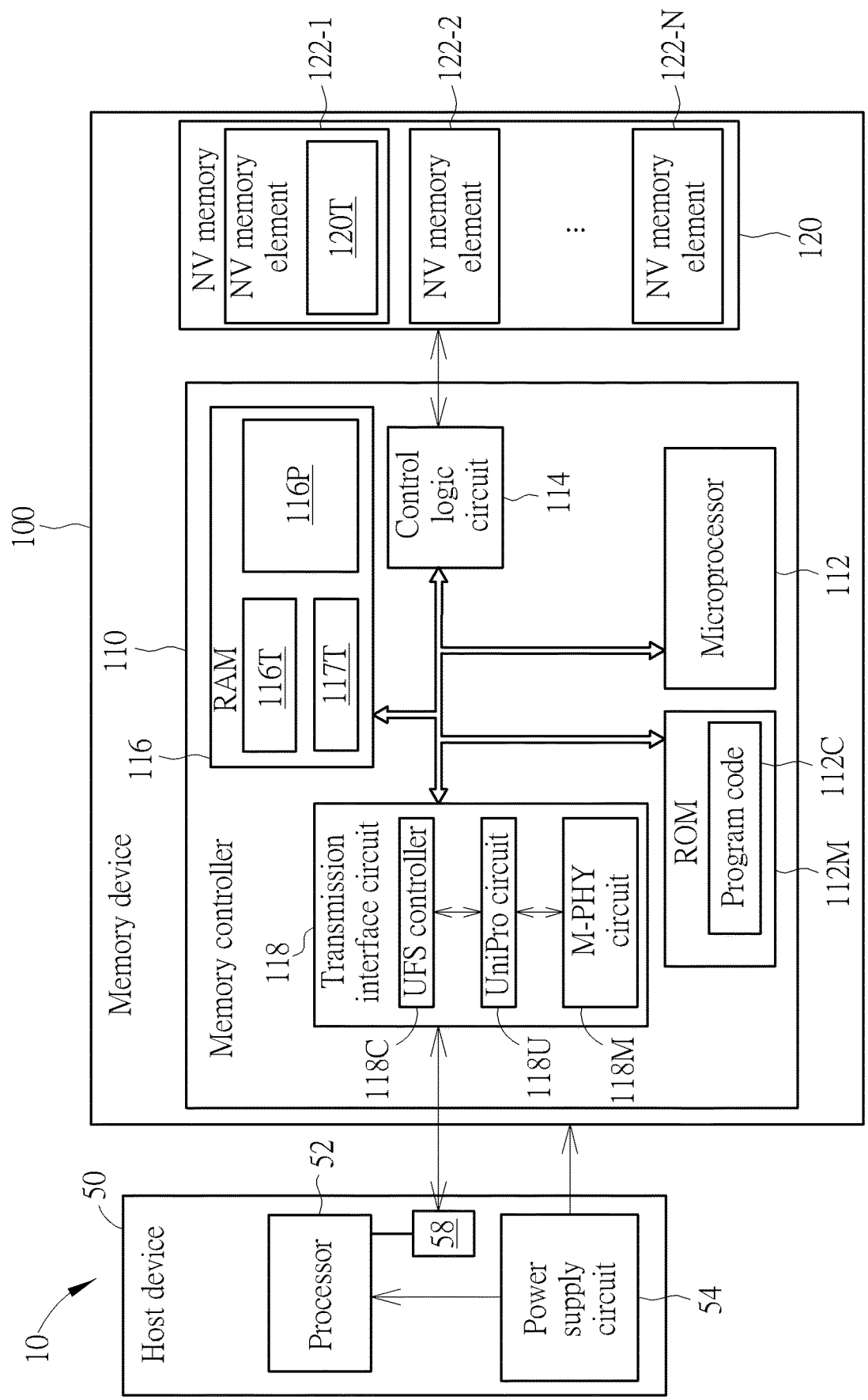
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . and 122-N, where "N" may represent a positive integer that is greater than one. For example, the NV memory 120 may be a flash memory, and the plurality of NV memory elements 122-1, 122-2, . . . and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a Random Access Memory (RAM) 116, and a transmission interface circuit 118, where at least one portion (e.g., a portion or all) of the above components may be coupled to one another via a bus. The RAM 116 may be arranged to provide the memory controller 110 with internal storage space (for example, may temporarily store information), where the RAM 116 may be implemented by way of Static Random Access Memory (SRAM), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120, and may comprise an error correction code (ECC) circuit (not shown), for performing ECC encoding and ECC decoding, to protect data and/or perform error correction, and the transmission interface circuit 118 may comprise multiple sub-circuits, which may interact with each other to perform communications. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specification for the host device 50. For example, the multiple sub-circuits of the transmission interface circuit 118 may comprise a UFS controller 118C, a UniPro circuit 118U and a physical layer (PHY) circuit such as a MIPI M-PHY circuit 118M (labeled "M-PHY circuit" for brevity), and the transmission interface circuit 58 may be implemented to have a circuitry architecture (e.g., multiple corresponding sub-circuits) similar to or the same as that of the transmission interface circuit 118, but the present invention is not limited thereto.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationships between the physical addresses and the logical addresses. The NV memory 120 may store a global L2P address mapping table 120T, for the memory controller 110 to control the memory device 100 to access data in the NV memory 120, but the present invention is not limited thereto. In addition, the memory controller 110 may generate or update at least one physical-to-logical (P2L) address mapping table such as a temporary P2L address mapping table 117T. For example, when there is a need, the memory controller 110 may refer to the temporary P2L address mapping table 117T to perform some internal management operations such as garbage collection (GC) operations, etc.

For better comprehension, the global L2P address mapping table 120T may be located in a predetermined region within the NV memory element 122-1, such as a system region, but the present invention is not limited thereto. For example, the global L2P address mapping table 120T may be divided into a plurality of local L2P address mapping tables, and the plurality of local L2P address mapping tables may be stored in one or more of the NV memory elements 122-1, 122-2, . . . and 122-N, and more particularly, may be stored in the NV memory elements 122-1, 122-2, . . . and 122-N, respectively. When there is a needed, the memory controller 110 may load at least one portion (e.g., a portion or all) of the global L2P address mapping table 120T into the RAM 116 or other memories. For example, the memory controller 110 may load a local L2P address mapping table (e.g., a first local L2P address mapping table) among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto.

The memory region of the RAM 116 may comprise multiple sub-regions for temporarily storing various information such as buffered data, the temporary L2P address mapping table 116T, the temporary P2L address mapping table 117T, etc., and at least one portion of sub-regions (e.g., a portion of sub-regions or all sub-regions) among the multiple sub-regions of the memory region may be regarded as a data buffer. For example, the sub-region for temporarily storing the buffered data may be regarded as the data buffer, but the present invention is not limited thereto. According to some embodiments, the whole of the memory region, such as the multiple sub-regions for temporarily storing the buffered data, the temporary L2P address mapping table 116T, the temporary P2L address mapping table 117T, etc., may be regarded as the data buffer.

In addition, the aforementioned at least one NV memory element (e.g., the one or more NV memory elements such as { 122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-n (where "n" may represent any integer in the interval [1, N]) within the NV memory elements 122-1, 122-2, . . . and 122-N may comprise multiple blocks, and a block among the multiple blocks may comprise and record a specific number of pages, where the memory controller 110 may access a certain page of a certain block among the multiple blocks according to a block address and a page address.

According to some embodiments, the memory controller 110 may monitor valid page counts of at least one portion (e.g., a portion or all) of the plurality of blocks, respectively, for subsequent processing such as the GC operations. Regarding data reception, the memory controller 110 may configure at least one block (e.g., one or more blocks) among the plurality of blocks of the aforementioned at least one NV memory element (e.g., the one or more NV memory elements such as { 122-1, 122-2, . . . , 122-N}) in the NV memory 120 to be at least one active block (e.g., one or more active blocks), and utilize the aforementioned at least one active block to receive and store data from the host device 50, such as host-write data. For example, the data such as the host-write data (e.g., the data to be written into the NV memory 120) may comprise a plurality of sets of partial data, and the aforementioned at least one active block may comprise a first active block, where the temporary P2L address mapping table 117T may correspond to the first active block, and more particularly, store the associated mapping information for indicating P2L address mapping relationships regarding the first active block. In addition, the memory controller 110 may maintain (e.g., generate or update) the temporary P2L address mapping table 117T, in order to perform the associated internal management.

Figure 2:
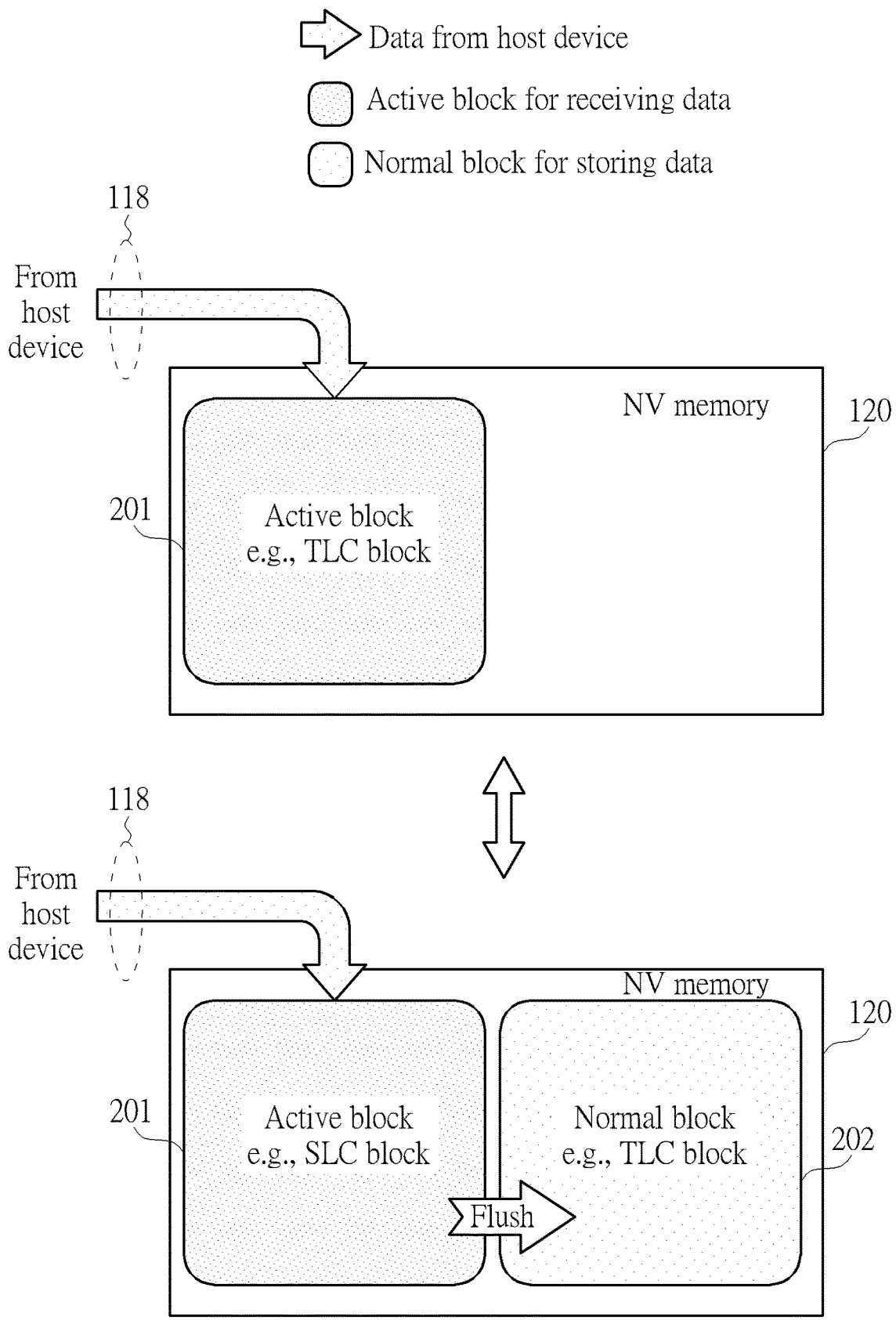
FIG. 2 illustrates an automatically configured data reception control scheme of a method for performing access management of a memory device in a predetermined communications architecture with aid of automatic parameter setting according to an embodiment of the present invention.

FIG. 2 illustrates an automatically configured data reception control scheme of a method for performing access management of a memory device in a predetermined communications architecture with aid of automatic parameter setting according to an embodiment of the present invention. The memory controller 110 may operate according to the automatically configured data reception control scheme to selectively perform data reception in a first data reception mode as shown in the upper half of FIG. 2 or perform data reception in a second data reception mode as shown in the lower half of FIG. 2, and more particularly, automatically perform data reception in the second data reception mode when there is a need, no matter whether the host device 50 is aware of all of the capabilities of the memory device 100

(or the memory controller 110), such as the capability of performing data reception in the first data reception mode, the capability of performing data reception in the second data reception mode, etc., where the memory controller 110 may perform automatic parameter setting on a plurality of parameters in a parameter region 116P within the RAM 116 for controlling the memory device 100 to operate in the second data reception mode according to the plurality of parameters, having no need to rely on any parameter setting by the host device 50, but the present invention is not limited thereto. In addition, during receiving and storing the data such as the host-write data (e.g., the data to be written into the NV memory 120) from the host device 50, the memory controller 110 may utilize the first active block such as an active block 201 to receive and store one or more sets of partial data among the plurality of sets of partial data, and record the associated mapping information such as P2L table entries into the temporary P2L address mapping table 117T shown in FIG. 1 (e.g., the temporary P2L address mapping table 117T corresponding to the active block 201), for indicating the P2L address mapping relationships regarding the active block 201. The P2L address mapping relationships indicated by the P2L table entries may comprise the P2L address mapping relationships between the logical addresses at which the one or more sets of partial data are written by the host device 50 and the physical addresses indicating the locations where the one or more sets of partial data are stored in the active block 201.

As shown in the upper half of FIG. 2, the active block 201 of the first data reception mode may be implemented by way of a triple level cell (TLC) block, but the present invention is not limited thereto. For example, the active block 201 of the first data reception mode may be implemented by way of a multiple level cell (MLC) block such as a double level cell (DLC) block. In some examples, the active block 201 of the first data reception mode may be implemented by way of any of the DLC block, the TLC block, a quad-level cell (QLC) block, a penta-level cell (PLC) block, etc. For better comprehension, the DLC block may provide the data storage of 2 bits per memory cell, the TLC block may provide the data storage of 3 bits per memory cell, the QLC block may provide the data storage of 4 bits per memory cell, and the PLC block may provide the data storage of 5 bits per memory cell.

As shown in the lower half of FIG. 2, the active block 201 of the second data reception mode may be implemented by way of a single level cell (SLC) block, and the SLC block may provide the data storage of 1 bit per memory cell. When using the active block 201 such as the SLC block to receive the host data, the memory controller 110 may rapidly complete the data reception in the second data reception mode, and therefore may have a faster response to the host device 50 than that of the first data reception mode. In addition, the memory controller 110 may flush (e.g., collect, copy and/or move) the data in the active block 201 into another block such as a normal block 202 for storing the data, where the normal block 202 of the second data reception mode may be implemented by way of a TLC block, but the present invention is not limited thereto. For example, the normal block 202 of the second data reception mode may be implemented by way of a MLC block such as a DLC block. In some examples, the normal block 202 of the second data reception mode may be implemented by way of any of the DLC block, the TLC block, a QLC block, a PLC block, etc.

According to some embodiments, when a first predetermined criterion (e.g., the active block 201 is fully programmed) is met, the memory controller 110 may perform a set of table processing operations, and the set of table processing operations may comprise:

(1) a first table processing operation: updating the global L2P address mapping table 120T shown in FIG. 1 according to the temporary P2L address mapping table 117T shown in FIG. 1, such as the temporary P2L address mapping table 117T corresponding to the active block 201, and more particularly, updating some L2P table entries in the global L2P address mapping table 120T according to the P2L table entries in the temporary P2L address mapping table 117T, for indicating L2P address mapping relationships regarding the active block 201;

(2) a second table processing operation: storing the temporary P2L address mapping table 117T into the NV memory 120, and more particularly, storing the P2L table entries in the temporary P2L address mapping table 117T into the NV memory 120, to generate or update a first P2L address mapping table (not shown) in the NV memory 120, for example, by writing all P2L table entries recorded in the temporary P2L address mapping table 117T into the first P2L address mapping table, for performing the subsequent processing mentioned above, where the first P2L address mapping table may be regarded as a backup version of the temporary P2L address mapping table 117T; and (3) a third table processing operation: after performing the first table processing operation and the second table processing operation, clearing the temporary P2L address mapping table 117T, and more particularly, clearing the P2L table entries in the temporary P2L address mapping table 117T, for reusing the temporary P2L address mapping table 117T and/or the corresponding storage space in the RAM 116;

but the present invention is not limited thereto. According to some embodiments, the first table processing operation may comprise loading a certain local L2P address mapping table (e.g., the first local L2P address mapping table) within the global L2P address mapping table 120T into the RAM 116 to be the temporary L2P address mapping table 116T shown in FIG. 1, updating one or more L2P table entries in the temporary L2P address mapping table 116T to indicate one or more L2P address mapping relationships among the L2P address mapping relationships regarding the active block 201, and updating the global L2P address mapping table 120T (or the aforementioned certain local L2P address mapping table therein) according to the temporary L2P address mapping table 116T.

For example, if the memory controller 110 is operating in the first data reception mode as shown in the upper half of FIG. 2, after any active block (e.g., the active block 201) among the aforementioned at least one active block is fully programmed, the memory controller 110 may close the aforementioned any active block to make the aforementioned any active block become an inactive block, and select a blank block (e.g., an erased block) to be a replacement of the aforementioned any active block, for performing subsequent data reception corresponding to the aforementioned any active block, where the subsequent processing mentioned above may comprise performing a GC procedure to write valid data among all data in the inactive block into another blank block (e.g., another erased block), but the present invention is not limited thereto. In addition, if the memory controller 110 is operating in the second data reception mode as shown in the lower half of FIG. 2, after any active block (e.g., the active block 201) among the aforementioned at least one active block is fully programmed, the memory controller 110 may close the aforementioned any active block to make the aforementioned any active block become an inactive block, and select a blank block (e.g., an erased block) to be a replacement of the aforementioned any active block, for performing subsequent data reception corresponding to the aforementioned any active block, where the subsequent processing mentioned above may comprise performing a flushing procedure to write all data in the inactive block into the normal block 202, but the present invention is not limited thereto. In some examples, the memory controller 110 may write valid data among all data in the inactive block into the normal block 202.

According to some embodiments, as the P2L address mapping relationships indicated by the P2L table entries in the aforementioned at least one P2L address mapping table (e.g., the temporary P2L address mapping table 117T or the first P2L address mapping table) and the L2P address mapping relationships indicated by the associated L2P table entries in the L2P address mapping table 120T are supposed to be inverse address mapping relationships of each other, the memory controller 110 may determine the latest mapping information (e.g., physical addresses) carried by the associated L2P table entries in the L2P address mapping table 120T according to the latest mapping information (e.g., logical addresses) carried by the P2L table entries in the aforementioned at least one P2L address mapping table.

Figure 3:
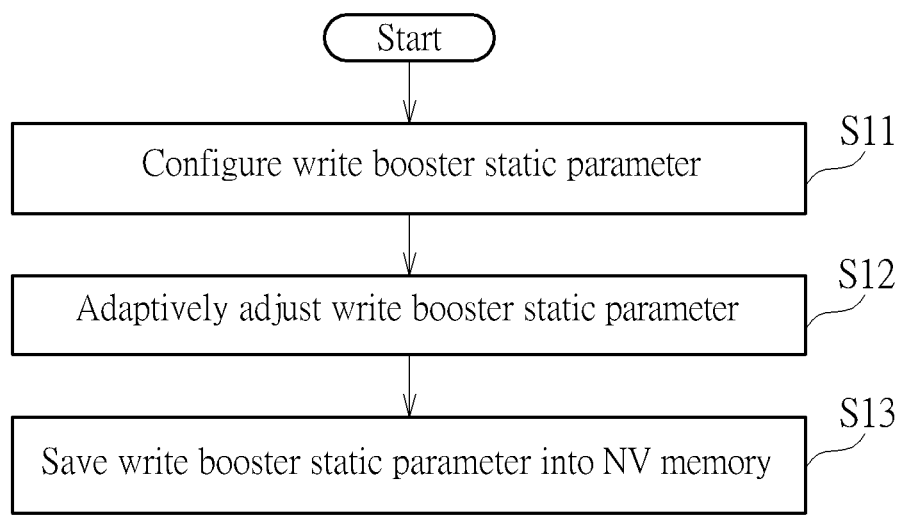
FIG. 3 illustrates a static parameter configuration control scheme of the method according to an embodiment of the present invention.

FIG. 3 illustrates a static parameter configuration control scheme of the method according to an embodiment of the present invention. The memory controller 110 may dynamically adjust at least one write booster static parameter $SP_{WB}$ (e.g., one or more write booster static parameters $\{SP_{WB}\}$) of a write booster function, and more particularly, may adjust the aforementioned at least one write booster static parameter $SP_{WB}$ as requested by the host device 50, and adaptively adjust the aforementioned at least one write booster static parameter $SP_{WB}$ when there is a need, where the aforementioned at least one write booster static parameter $SP_{WB}$ may also be referred to as at least one static parameter $SP_{WB}$ for brevity, but the present invention is not limited thereto.

In Step S11, the host device 50 may configure the aforementioned at least one write booster static parameter $SP_{WB}$. For example, the host device 50 may send at least one predetermined value of the aforementioned at least one write booster static parameter $SP_{WB}$ to the memory controller 110, in order to configure the aforementioned at least one write booster static parameter $SP_{WB}$ with the aforementioned at least one predetermined value.

In Step S12, the memory controller 110 may adaptively adjust the aforementioned at least one write booster static parameter $SP_{WB}$. For example, when receiving the aforementioned at least one predetermined value of the aforementioned at least one write booster static parameter $SP_{WB}$ from the host device 50, the memory controller 110 may set at least one initial value of the aforementioned at least one write booster static parameter $SP_{WB}$ according to the aforementioned at least one predetermined value of the aforementioned at least one write booster static parameter $SP_{WB}$, but the present invention is not limited thereto. If a predetermined value of any write booster static parameter $SP_{WB}$ among the aforementioned at least one write booster static parameter $SP_{WB}$ exceeds a predetermined range of the aforementioned any write booster static parameter $SP_{WB}$, the memory controller 110 may set an initial value of the aforementioned any write booster static parameter $SP_{WB}$ to be a value within the predetermined range.

In Step S13, the memory controller 110 may save the aforementioned at least one write booster static parameter $SP_{WB}$ into the NV memory 120, for further use by the memory controller 110. More particularly, the memory controller 110 may save the aforementioned at least one write booster static parameter $SP_{WB}$ into the predetermined region (e.g., the system region) within the NV memory 120, for further use in the future. For example, the memory device 100 may enter a power-off state and enter a power-on state afterward, and the memory controller 110 may load the aforementioned at least one write booster static parameter $SP_{WB}$ from the predetermined region within the NV memory 120 into the parameter region 116P within the RAM 116.

The aforementioned at least one write booster static parameter $SP_{WB}$ may comprise multiple write booster static parameters $\{SP_{WB}\}$ such as the write booster static parameters $\{SP_{WB}(0), SP_{WB}(1), SP_{WB}(2)\}$. For example, the write booster static parameter $SP_{WB}$ (0) may represent a static parameter bWriteBoosterBufferPreserveUserSpaceEn for indicating a write booster user space mode, the write booster static parameter $SP_{WB}(1)$ may represent a static parameter bWriteBoosterBufferType for indicating a write booster buffer type mode, and the write booster static parameter $SP_{WB}$ (2) may represent a static parameter dNumSharedWriteBoosterBufferAllocUnits for indicating a write booster buffer size. More particularly, the memory controller 110 may set the static parameter bWriteBoosterBufferPreserveUserSpaceEn to be a first predetermined mode-enabling value to enable the Preserve User Space mode, for preserving the user space without any reduction of storage volume in the user space. In addition, the memory controller 110 may set the static parameter bWriteBoosterBufferType to be a first predetermined mode value corresponding to a Shared Buffer mode to enable the Shared Buffer mode, for sharing the write booster buffer for all logical unit numbers (LUNs). Additionally, the memory controller 110 may set the static parameter dNumSharedWriteBoosterBufferAllocUnits to be a candidate value among multiple candidate values of the static parameter dNumSharedWriteBoosterBufferAllocUnits, for indicating the write booster buffer size, where the multiple candidate values may fall within a predetermined range of the static parameter dNumSharedWriteBoosterBufferAllocUnits. For example, the minimum among the multiple candidate values may correspond to the minimum write booster size of 4 gigabytes (GB), and the maximum among the multiple candidate values may correspond to the maximum write booster size defined by a predetermined parameter dWriteBoosterBufferMaxNAllocUnits of the memory device 100. When the host device 50 tries to configure the static parameter dNumSharedWriteBoosterBufferAllocUnits to be a first value corresponding to a non-configurable write booster size that is less than 4 GB, the memory controller 110 may set the static parameter dNumSharedWriteBoosterBufferAllocUnits to be the minimum among the multiple candidate values, for setting the write booster buffer size as the minimum write booster size of 4 GB. When the host device 50 tries to configure the static parameter dNumSharedWriteBoosterBufferAllocUnits to be a second value corresponding to another non-configurable write booster size that is greater than the maximum write booster size defined by the predetermined parameter dWriteBoosterBufferMaxNAllocUnits, the memory controller 110 may set the static parameter dNumSharedWriteBoosterBufferAllocUnits to be the maximum among the multiple candidate values, for setting the write booster buffer size as the maximum write booster size defined by the predetermined parameter dWriteBoosterBufferMaxNAllocUnits.

For better comprehension, the method may be illustrated with the working flow shown in FIG. 3, but the present invention is not limited thereto. According to some embodiments, one or more steps may be added, deleted, or changed in the working flow shown in FIG. 3. For example, the memory controller 110 may store at least one default value of the aforementioned at least one write booster static parameter $SP_{WB}$ in advance, for being used as the aforementioned at least one predetermined value of the aforementioned at least one write booster static parameter $SP_{WB}$. In a situation where the host device 50 is not able to perform the associated control of the write booster function, the memory controller 110 may set the aforementioned at least one initial value of the aforementioned at least one write booster static parameter $SP_{WB}$ according to the aforementioned at least one predetermined value such as the aforementioned at least one default value by itself, and adjust the aforementioned at least one write booster static parameter $SP_{WB}$ when there is a need. For brevity, similar descriptions for these embodiments are not repeated in detail here.

BoosterBufferType and dNumSharedWriteBoosterBufferAllocUnits at the offsets {53h, 54h, 55h}, respectively, and the static parameters bWriteBoosterBufferPreserveUserSpaceEn, bWriteBoosterBufferType and dNumSharedWriteBoosterBufferAllocUnits may have the manufacturer default values (MDVs) {0, 0, 0}, respectively, but the present invention is not limited thereto. In some examples, the table contents shown in Table 1 may vary. In addition, after device manufacturing of the memory device 100, the aforementioned at least one write booster static parameter $SP_{WB}$ such as the static parameters bWriteBoosterBufferPreserveUserSpaceEn, bWriteBoosterBufferType and dNumSharedWriteBoosterBufferAllocUnits may have the MDVs {0, 0, 0}, respectively. When there is a need, the memory controller 110 may set the aforementioned at least one initial value of the aforementioned at least one write booster static parameter $SP_{WB}$ according to the aforementioned at least one predetermined value such as the aforementioned at least one default value by itself, and more particularly, automatically set the respective initial values of the static parameters

TABLE 1

| Offset | Size | Name | MDV | Description |
|---|---|---|---|---|
| 53h | 1 | bWriteBooster-BufferPreserve-UserSpaceEn | 0 | Preserve User Space mode<br>00h: User space is reduced if WriteBooster Buffer is configured. The WriteBooster Buffer reduces the user space that can be configured at provisioning.<br>01h: User space shall not be reduced if WriteBooster Buffer is configured. If the user space is almost consumed the WriteBooster Buffer space may be used as the user space. During the migration of the WriteBooster Buffer space to the user space, there could be performance degradation.<br>Others: Reserved |
| 54h | 1 | bWriteBooster-BufferType | 0 | WriteBooster Buffer Type<br>00h: logical unit (LU) dedicated buffer type<br>01h: Single shared buffer type |
| 55h | 4 | dNumShared-WriteBooster-BufferAlloc-Units | 0 | The WriteBooster Buffer size for the shared WriteBooster Buffer configuration.<br>The dNumSharedWriteBoosterBufferAllocUnits value shall be calculated using the following equation:<br>dNumSharedWriteBoosterBufferAllocUnits = CEILING((WriteBoosterBufferCapacity × 1)/(bAllocationUnitSizexdSegmentSize × 512)), where WriteBoosterBufferCapacity is the desired WriteBooster Buffer size expressed in bytes, and "CEILING( )" may represent a ceiling function CEILING(x) (which may also be denoted [x] or ceil(x)) for mapping an input value x of the ceiling function CEILING(x) to the least integer greater than or equal to the input value x.<br>For example, to configure 4 GB WriteBooster Buffer if bAllocationUnitSize = 8, and dSegmentSize = 1024, then the value for the dNumSharedWriteBoosterBufferAllocUnits is 400h. If this value is zero, then the shared WriteBooster is not configured for this device. |

Table 1 illustrates an example of some parameters in a device descriptor involved with the method, where the device descriptor may be arranged to carry the static parameters bWriteBoosterBufferPreserveUserSpaceEn, bWriteBoosterBufferType and dNumSharedWriteBoosterBufferAllocUnits to be equal to some predetermined values (e.g., some predetermined attribute values, which may be different from the MDVs) by itself, having no need to rely on any host request regarding the write booster function from the host device 50. For example, the memory controller 110 may adjust the aforementioned at least one write booster static parameter $SP_{WB}$ such as the static parameters bWriteBoosterBufferPreserveUserSpaceEn, bWriteBoosterBufferType and dNumSharedWriteBoosterBufferAllocUnits in the device descriptor from the MDVs {0, 0, 0} to be equal to these predetermined values such as the attribute values {1, 1, 0}, respectively. In another example, the memory controller 110 may adjust the aforementioned at least one write booster static parameter $SP_{WB}$ such as the static parameters bWriteBoosterBufferPreserveUserSpaceEn, bWriteBoosterBufferType and dNumSharedWriteBoosterBufferAllocUnits in the device descriptor from the MDVs {0, 0, 0} to be equal to these predetermined values such as the attribute values {01h, 01h, 400h}, respectively.

TABLE 2

| Offset | Size | Name | MDV | Description |
| --- | --- | --- | --- | --- |
| 10h | 1 | bWriteBooster-BufferPreserve-UserSpaceEn | 0 | Enable preserve user space when WriteBooster Buffer is configured. |
| 11h | 1 | bWriteBooster-BufferType | 0 | Configure the WriteBooster Buffer type |
| 12h | 4 | dNumShared-WriteBooster-BufferAlloc-Units | 0 | Configure the WriteBooster Buffer size for a shared WriteBooster Buffer configuration. |

Table 2 illustrates an example of some parameters in a configuration descriptor involved with the method, where the configuration descriptor may be arranged to carry the static parameters bWriteBoosterBufferPreserveUserSpaceEn, bWriteBoosterBufferType and dNumSharedWriteBoosterBufferAllocUnits at the offsets { 10h, 11h, 12h}, respectively, and the static parameters bWriteBoosterBufferPreserveUserSpaceEn, bWriteBoosterBufferType and dNumSharedWriteBoosterBufferAllocUnits may have the MDVs {0, 0, 0}, respectively, but the present invention is not limited thereto. In some examples, the table contents shown in Table 2 may vary. In addition, after device manufacturing of the memory device 100, the aforementioned at least one write booster static parameter $SP_{WB}$ such as the static parameters bWriteBoosterBufferPreserveUserSpaceEn, bWriteBoosterBufferType and dNumSharedWriteBoosterBufferAllocUnits may have the MDVs {0, 0, 0}, respectively. When there is a need, the memory controller 110 may set the aforementioned at least one initial value of the aforementioned at least one write booster static parameter $SP_{WB}$ according to the aforementioned at least one predetermined value such as the aforementioned at least one default value by itself, and more particularly, automatically set the respective initial values of the static parameters bWriteBoosterBufferPreserveUserSpaceEn, bWriteBoosterBufferType and dNumSharedWriteBoosterBufferAllocUnits to be equal to some predetermined values (e.g., some predetermined attribute values, which may be different from the MDVs) by itself, having no need to rely on any host request regarding the write booster function from the host device 50. For example, the memory controller 110 may adjust the aforementioned at least one write booster static parameter $SP_{WB}$ such as the static parameters bWriteBoosterBufferPreserveUserSpaceEn, bWriteBoosterBufferType and dNumSharedWriteBoosterBufferAllocUnits in the configuration descriptor from the MDVs {0, 0, 0} to be equal to these predetermined values such as the attribute values {1, 1, 0}, respectively. In another example, the memory controller 110 may adjust the aforementioned at least one write booster static parameter $SP_{WB}$ such as the static parameters bWriteBoosterBufferPreserveUserSpaceEn, bWriteBoosterBufferType and dNumSharedWriteBoosterBufferAllocUnits in the configuration descriptor from the MDVs {0, 0, 0} to be equal to these predetermined values such as the attribute values {01h, 01h. 400h}, respectively.

As shown in Table 2, the configuration descriptor may comprise some parameters in the device descriptor, such as the static parameters bWriteBoosterBufferPreserveUserSpaceEn, bWriteBoosterBufferType and dNumSharedWriteBoosterBufferAllocUnits shown in Table 1, for indicating the parameters that may be configured. In Step S11, the host device 50 may send a query request UFS Protocol Information Unit (UPIU) to the memory controller 110 to write the configuration descriptor carrying the write booster static parameters { $SP_{WB}(0)$, $SP_{WB}(1)$, $SP_{WB}(2)$} (e.g., the static parameters bWriteBoosterBufferPreserveUserSpaceEn, bWriteBoosterBufferType and dNumSharedWriteBoosterBufferAllocUnits) into the parameter region 116P within the RAM 116, in order to notify the memory controller 110 of the aforementioned at least one predetermined value of the aforementioned at least one write booster static parameter $SP_{WB}$, such as the respective predetermined values of the write booster static parameters {$SP_{WB}(0)$, $SP_{WB}(1)$, $SP_{WB}(2)$} (e.g., the static parameters bWriteBoosterBufferPreserve UserSpaceEn, bWriteBoosterBufferType and dNumSharedWriteBoosterBufferAllocUnits).

TABLE 3

| Offset | Size | Name | Value | Description |
| --- | --- | --- | --- | --- |
| 4Fh | 4 | dWriteBooster-BufferMaxN-AllocUnits | Device specific | Maximum total WriteBooster Buffer size which is supported by the entire device. The summation of the WriteBooster Buffer size for all logical units (LUs) should be equal to or less than size value indicated by this descriptor. |
| 54h | 1 | bWriteBooster-BufferCapAdj-Fac | Device specific | Capacity Adjustment Factor for the WriteBoosterBuffer memory type. This value provides the logical block address (LBA) space reduction multiplication factor when WriteBooster Buffer is configured in user space reduction mode. |

TABLE 3-continued

| Offset | Size | Name | Value | Description |
|---|---|---|---|---|
| | | | | Therefore, this parameter applies only if bWriteBoosterBufferPreserveUserSpaceEn is 00h. For "LU dedicated buffer" mode, the total user space is decreased by the following amount: bWriteBoosterBufferCapAdjFac * dLUNumWriteBoosterBufferAllocUnits * bAllocationUnitSize * dSegmentSize * 512 byte'. For "shared buffer" mode, the total user space is decreased by the following amount: bWriteBoosterBufferCapAdjFac * dNumSharedWriteBoosterBufferAllocUnits * bAllocationUnitSize * dSegmentSize * 512 byte. The value of this parameter is 3 for TLC NAND flash memory when SLC mode is used as WriteBooster Buffer. 2 for MLC NAND flash memory. |
| 55h | 1 | bSupported-WriteBooster-BufferUser-Space-ReductionTypes | Device specific | The supportability of user space reduction mode and preserve user space mode. 00h: WriteBooster Buffer can be configured only in user space reduction type. 01h: WriteBooster Buffer can be configured only in preserve user space type. 02h: Device can be configured in either user space reduction type or preserve user space type. Others: Reserved |
| 56h | 1 | bSupported-WriteBooster-BufferTypes | Device specific | The supportability of WriteBooster Buffer type. 00h: LU based WriteBooster Buffer configuration 01h: Single shared WriteBooster Buffer configuration 02h: Supporting both LU based WriteBooster Buffer and Single shared WriteBooster Buffer configuration Others: Reserved |

Table 3 illustrates an example of some parameters in a geometry descriptor involved with the method, where the geometry descriptor may be arranged to carry the parameters dWriteBoosterBufferMaxNAllocUnits, bWriteBoosterBufferCapAdjFac, bSupportedWriteBoosterBufferUserSpaceReductionTypes and bSupportedWriteBoosterBufferTypes at the offsets {4Fh, 54h, 55h, 56h}, respectively, but the present invention is not limited thereto. In some examples, the table contents shown in Table 3 may vary. Typically, the geometry descriptor may be device specific, and the values of these parameters in the geometry descriptor may be determined in advance, and more particularly, may be determined as some attribute values after manufacturing of the memory device 100. The memory controller 110 may load the geometry descriptor from the predetermined region (e.g., the system region) within the NV memory 120 into the parameter region 116P within the RAM 116, and control the geometry descriptor in the parameter region 116P to be read-only for the host device 50. For example, if the host device 50 has been designed to be capable of determining the capabilities of the memory device 100 regarding the write booster function according to the geometry descriptor, the host device 50 may send a query request UPIU to ask for reading the geometry descriptor, and may execute Step S11 according to one or more parameters in the geometry descriptor.

The one or more parameters in the geometry descriptor may comprise the last two parameters and the first parameter shown in Table 3, such as the parameters bSupportedWriteBoosterBufferUserSpaceReductionTypes, bSupportedWriteBoosterBufferTypes and dWriteBoosterBufferMaxNAllocUnits. For example, the memory controller 110 may use the parameter bSupportedWriteBoosterBufferUserSpaceReductionTypes to notify the host device 50 of the capability regarding the write booster static parameter $SP_{WB}(0)$ (e.g., the static parameter bWriteBoosterBufferPreserveUserSpaceEn), use the parameter bSupportedWriteBoosterBufferTypes to notify the host device 50 of the capability regarding the write booster static parameter $SP_{WB}(1)$ (e.g., the static parameter bWriteBoosterBufferType), and use the parameter dWriteBoosterBufferMaxNAllocUnits to notify the host device 50 of the capability regarding the write booster static parameter $SP_{WB}(2)$ (e.g., the static parameter dNumSharedWriteBoosterBufferAllocUnits). In addition, the host device 50 may execute Step S11 to try configuring the write booster static parameter $SP_{WB}(0)$ such as the static parameter bWriteBoosterBufferPreserveUserSpaceEn according to the parameter bSupportedWriteBoosterBufferUserSpaceReductionTypes, try configuring the write booster static parameter $SP_{WB}(1)$ such as the static parameter bWriteBoosterBufferType according to the parameter bSupportedWriteBoosterBufferTypes, and try configuring the write booster static parameter $SP_{WB}(2)$ such as the static parameter dNumSharedWriteBoosterBufferAllocUnits according to the parameter dWriteBoosterBufferMaxNAllocUnits, where the memory controller 110 may execute Step S12 to set the respective initial values of the write booster static parameters $\{SP_{WB}(0), SP_{WB}(1), SP_{WB}(2)\}$ (e.g., the static parameters bWriteBoosterBufferPreserveUserSpaceEn, bWriteBoosterBufferType and dNumSharedWriteBoosterBufferAllocUnits) as requested by the host device 50, but the present invention is not limited thereto. For example, if the host device 50 is trying configuring the write booster static parameter $\{SP_{WB}(0), SP_{WB}(1), SP_{WB}(2)\}$ to be non-supported values corresponding to non-supported capabilities of the memory device 50, the memory controller 110 may adaptively adjust the write booster static parameter $\{SP_{WB}(0), SP_{WB}(1), SP_{WB}(2)\}$, and more particularly, set the initial values of the write booster static parameter $\{SP_{WB}(0), _{WB}1), SP_{WB}(2)\}$ according to the default values of the write booster static parameter $\{SP_{WB}(0), SP_{WB}(1), SP_{WB}(2)\}$, respectively.

According to some embodiments, the memory controller 110 may store any of various combinations of the parameters shown in Table 3 into the NV memory 120 in advance. For example, bSupportedWriteBoosterBufferUserSpace Reductio nTypes=01h and bSupportedWriteBoosterBuffer Types=01h. In another example, bSupportedWriteBoosterBufferUserSpaceReductionTypes=02h and bSupportedWriteBooster BufferTypes=02h. In yet another example, bSupportedWriteBoosterBufferUserSpaceReductionTypes=00h and bSupportedWriteBoosterBufferTypes=00h.

Figure 4:
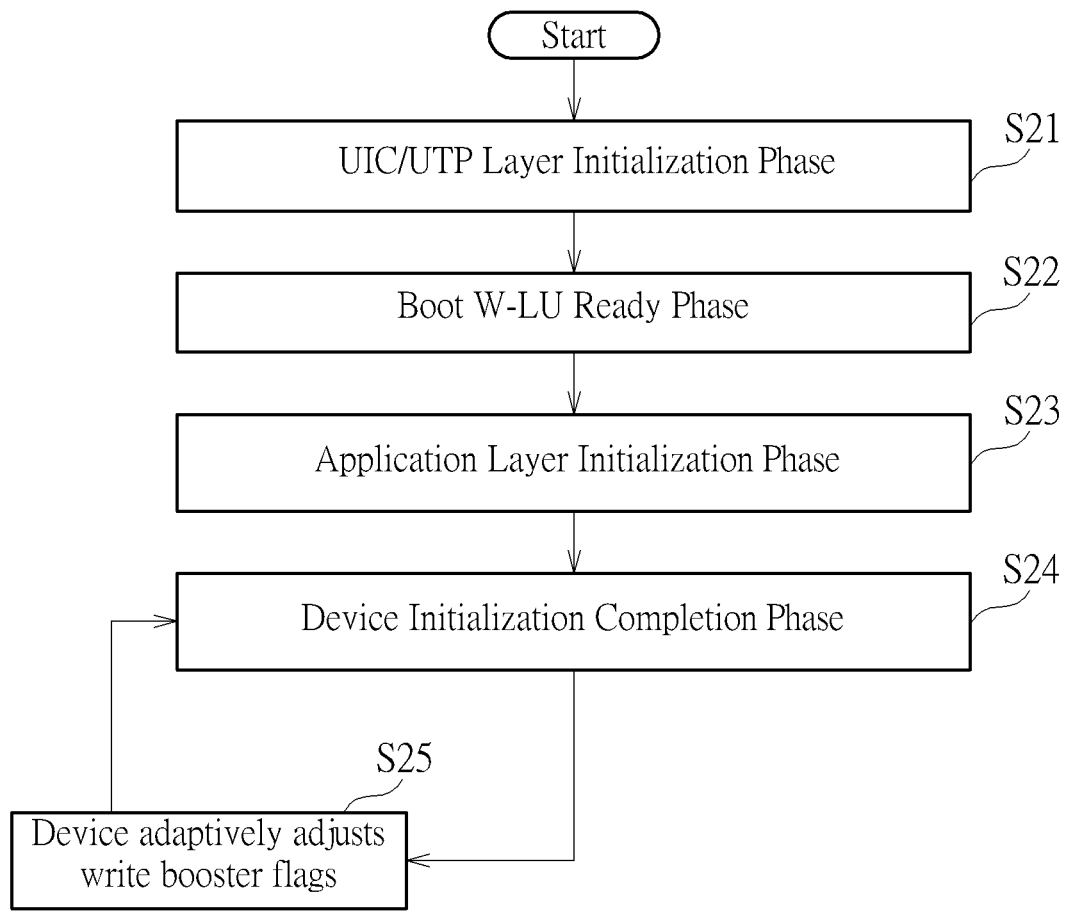
FIG. 4 illustrates a runtime parameter configuration control scheme of the method according to an embodiment of the present invention.

FIG. 4 illustrates a runtime parameter configuration control scheme of the method according to an embodiment of the present invention.

In Step S21, in a UFS Interconnect Layer (UIC)/UFS Transport Protocol Layer (UTP) initialization phase of the memory device 100, the memory controller 110 may perform initialization corresponding to the UIC/UTP initialization phase, and more particularly, perform hardware initialization and establish a link between the host device 50 and the memory controller 110 in the UIC/UTP initialization phase (labeled "UIC/UTP Layer Initialization Phase" for brevity).

In Step S22, in a boot well-known LU (W-LU) ready phase, the host device 50 may read a boot code regarding the UFS communications architecture to perform host initialization regarding the UFS communications architecture (labeled "Boot W-LU Ready Phase" for brevity).

In Step S23, in an Application Layer initialization phase of the memory device 100, the memory controller 110 may perform initialization corresponding to the Application Layer initialization phase, and more particularly, initialize at least one flash translation layer (FTL) control module running on the microprocessor 110 within the memory controller 110 and the plurality of NV memory elements 122-1, 122-2, . . . and 122-N within the NV memory 120 (labeled "Application Layer Initialization Phase" for brevity), where the aforementioned at least one FTL control module may be arranged to control L2P address mapping operations, reading operations, writing operations, erase operations, GC operations, etc., but the present invention is not limited thereto.

In Step S24, when the device initialization of the memory device 100 is completed, the memory controller 110 may enter a device initialization completion phase, to allow the host device 50 to access the NV memory 120 through the memory controller 110, where the memory device 100 is ready to serve the host device 50.

In Step S25, when there is a need, the memory controller 110 within the memory device 100 may adaptively adjust one or more write booster flags, such as one or more flags among a plurality of write booster flags of the write booster function (labeled "Device adaptively adjusts write booster flags" for brevity). For example, at least one protocol layer control module running on the microprocessor 110 within the memory controller 110 may be arranged to control the memory controller 110 to adaptively adjust the one or more write booster flags (e.g., the one or more flags among the plurality of write booster flags), but the present invention is not limited thereto. As a result, the memory controller 110 may adaptively adjust the plurality of write booster flags during runtime of the memory device 100.

For better comprehension, the method may be illustrated with the working flow shown in FIG. 4, but the present invention is not limited thereto. According to some embodiments, one or more steps may be added, deleted, or changed in the working flow shown in FIG. 4.

TABLE 4

| IDN | Name | Type | Default | Description |
|---|---|---|---|---|
| 0Eh | fWriteBoosterEn | Read/Volatile | 0 | WriteBooster Enable 0b: WriteBooster is not enabled. 1b: WriteBooster is enabled |
| 0Fh | fWriteBoosterBufferFlushEn | Read/Volatile | 0 | Flush the data in WriteBooster Buffer to the user area of storage. 0b: Flush operation is not performed. 1b: Flush operation is performed |
| 10h | fWriteBoosterBufferFlushDuringHibernate | Read/Volatile | 0 | Flush WriteBooster Buffer during hibernate state. 0b: Device is not allowed to flush the WriteBooster Buffer during link hibernate state. 1b: Device is allowed to flush the WriteBooster Buffer during link hibernate state. |

Table 4 illustrates an example of the plurality of write booster flags involved with the method, where the plurality of write booster flags may comprise the flags { fWriteBoosterEn, fWriteBoosterBufferFlushEn, fWriteBoosterBufferFlushDuringHibernate} respectively corresponding to the identifier numbers (IDNs) {0Eh, 0Fh, 10h}, but the present invention is not limited thereto. In some examples, the table contents shown in Table 4 may vary.

TABLE 5

| Time | t0 | t1 | t2 | t3 | t4 | t5 | t6 | ... |
|---|---|---|---|---|---|---|---|---|
| fWriteBoosterEn | 0 | 1 | 0 | 1 | 1 | 1 | 0 | ... |
| fWriteBoosterBufferFlushEn | 0 | 1 | 1 | 1 | 0 | 1 | 1 | ... |
| fWriteBoosterBufferFlushDuringHibernate | 0 | 1 | 1 | 1 | 0 | 1 | 1 | ... |

Table 5 illustrates an example of the variations of the plurality of write booster flags with respect to time, where the memory controller 110 may adaptively adjust the plurality of write booster flags such as the flags {fWriteBoosterEn, fWriteBoosterBufferFlushEn, fWriteBoosterBufferFlushDuringHibernate}, and the symbol " . . . " may indicate that some table contents may be omitted, but the present invention is not limited thereto. In some examples, the table contents shown in Table 5 may vary. The memory controller 110 may set the initial values of the flags { fWriteBoosterEn, fWriteBoosterBufferFlushEn, fWriteBoosterBufferFlushDuringHibernate} to be {0, 0, 0} at an initial time point t0, for example, during the device initialization. In addition, the memory controller 110 may execute Step S25 multiple times to adjust the flags {fWriteBoosterEn, fWriteBoosterBufferFlushEn, fWriteBoosterBufferFlushDuringHibernate} to be { {1, 1, 1}, {0, 1, 1}, {1, 1, 1}, {1, 0, 0}, {1, 1, 1}, {0, 1, 1}, . . . } at subsequent time points {t1, t2, t3, t4, t5, t6, . . . }, respectively, where the adjustment applied to the flags {fWriteBoosterEn, fWriteBoosterBufferFlushEn, fWriteBoosterBufferFlushDuringHibernate} by the memory controller 110 may depend on the latest states of the memory device 100 and/or any write-booster-related request regarding the write booster function from the host device 50 (if the host device 50 has been designed to be capable of perform associated control regarding the write booster function).

TABLE 6

| Time | t0 | t1 | t2 | t3 | t4 | t5 | . . . |
|---|---|---|---|---|---|---|---|
| fWriteBoosterEn | 1 | 0 | 1 | 1 | 1 | 0 | . . . |
| fWriteBoosterBufferFlushEn | 1 | 1 | 1 | 0 | 1 | 1 | . . . |
| fWriteBoosterBufferFlushDuringHibernate | 1 | 1 | 1 | 0 | 1 | 1 | . . . |

Table 6 illustrates another example of the variations of the plurality of write booster flags with respect to time, where the memory controller 110 may adaptively adjust the plurality of write booster flags such as the flags {fWriteBoosterEn, fWriteBoosterBufferFlushEn, fWriteBoosterBufferFlushDuringHibernate}, and the symbol " . . . " may indicate that some table contents may be omitted, but the present invention is not limited thereto. In some examples, the table contents shown in Table 6 may vary. The memory controller 110 may set the initial values of the flags { fWriteBoosterEn, fWriteBoosterBufferFlushEn, fWriteBoosterBufferFlushDuringHibernate} to be { 1, 1, 1} at the initial time point to, for example, during the device initialization. In addition, the memory controller 110 may execute Step S25 multiple times to adjust the flags {fWriteBoosterEn, fWriteBoosterBufferFlushEn, fWriteBoosterBufferFlushDuringHibernate} to be { {0, 1, 1}, {1, 1, 1}, {1, 0, 0}, {1, 1, 1}, {0, 1, 1} . . . .} at the subsequent time points {t1, t2, t3, t4, 15, . . . }, respectively, where the adjustment applied to the flags { fWriteBoosterEn, fWriteBoosterBufferFlushEn, fWriteBoosterBufferFlushDuringHibernate} by the memory controller 110 may depend on the latest states of the memory device 100 and/or any write-booster-related request regarding the write booster function from the host device 50 (if the host device 50 has been designed to be capable of perform associated control regarding the write booster function).

According to some embodiments, the host device 50 may represent any of various host devices {50} corresponding to various UFS platforms with different capabilities, where some of the host devices {50} may have limited capabilities corresponding to older UFS versions (e.g., UFS 2.1) and/or do not support the associated control of the write booster function. Under control of the memory controller 110, the memory device 100 may operate properly to enhance write performance, no matter whether the host device 50 supports the associated control of the write booster function. For example, if the host device 50 supports the associated control of the write booster function, the memory controller 110 may selectively set the aforementioned at least one initial value of the aforementioned at least one write booster static parameter $SP_{WB}$ as requested by the host device 50 or adjust the aforementioned at least one write booster static parameter $SP_{WB}$, and selectively enable or disable the write booster function by setting the plurality of write booster flags to be {1, 1, 1} or {0, 0, 0} as requested by the host device 50 when executing Step S25 the first time after the latest power-on event of the memory device 100, and further execute Step S25 multiple times to adaptively adjust the plurality of write booster flags during runtime of the memory device 100, in order to optimize the overall performance of the memory device 100; otherwise, the memory controller 110 may automatically set the aforementioned at least one initial value of the aforementioned at least one write booster static parameter $SP_{WB}$ according the aforementioned at least one default value by itself, without relying on the host device 50, and automatically enable the write booster function by setting the plurality of write booster flags to be {1, 1, 1} when executing Step S25 the first time after the latest power-on event of the memory device 100, in order to enhance the write performance, and further execute Step S25 multiple times to adaptively adjust the plurality of write booster flags during runtime of the memory device 100, in order to optimize the overall performance of the memory device 100.

For the case that the host device 50 does not support the associated control of the write booster function, as the memory controller 110 is capable of automatically enabling the write booster function, the memory controller 110 operating according to the method can enhance the write performance. For the case that the host device 50 supports the associated control of the write booster function, as the memory controller 110 is capable of performing parameter setting as requested by the host device 50, without being designed to forcibly perform data reception in the second data reception mode, the memory controller 110 operating according to the method can allow the host device 50 to manage the service life of the write booster buffer. At run time, no matter whether the host device 50 supports the associated control of the write booster function or not, the memory controller 110 may dynamically manage the write booster switch and flush timing, for example, by adjusting the plurality of write booster flags such as the flags { fWriteBoosterEn, fWriteBoosterBufferFlushEn, fWriteBoosterBufferFlushDuringHibernate}, and more particularly, adaptively configure the plurality of write booster flags based on the latest states of the memory device 100 in Step S25, in order to enhance the write performance or maintain the service life of the write booster buffer. For brevity, similar descriptions for these embodiments are not repeated in detail here.

Figure 5:
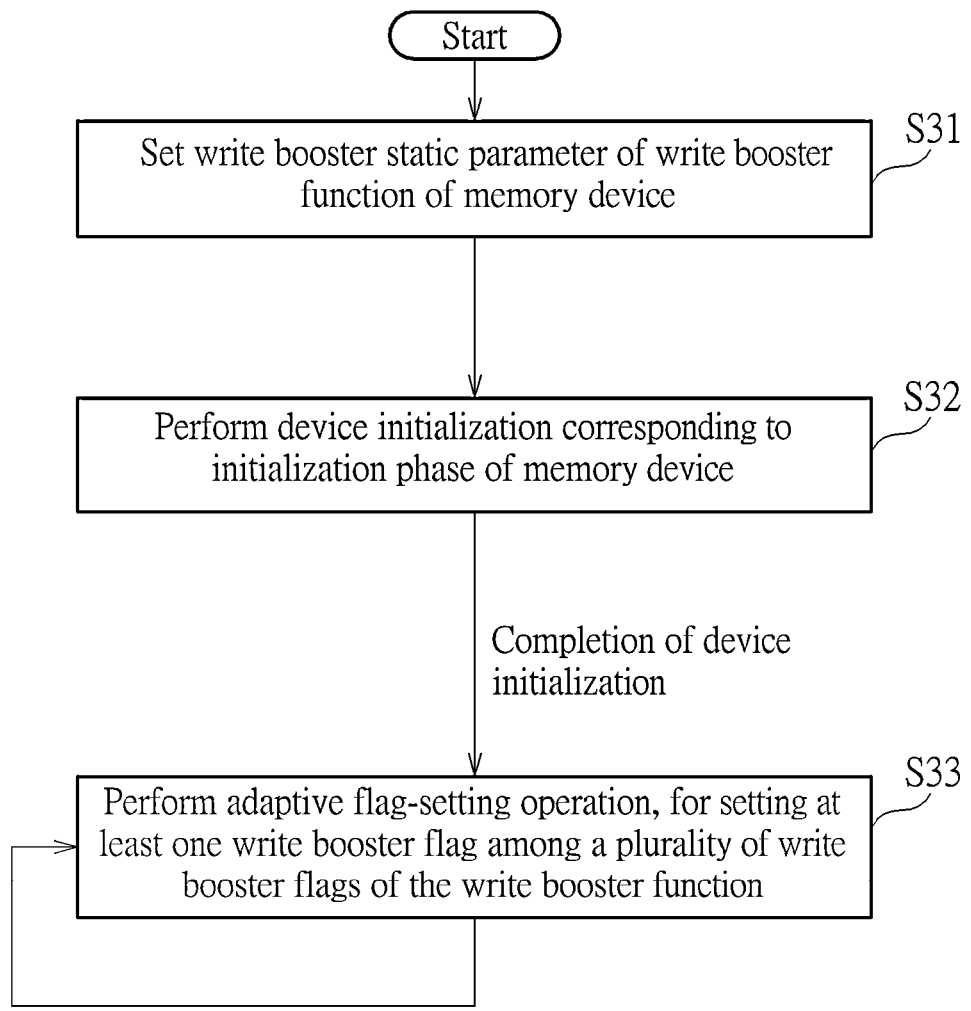
FIG. 5 illustrates a working flow of the method according to an embodiment of the present invention.

FIG. 5 illustrates a working flow of the method according to an embodiment of the present invention.

In Step S31, the memory controller 110 may set the aforementioned at least one write booster static parameter $SP_{WB}$ of the write booster function of the memory device 100, and more particularly, save the aforementioned at least one write booster static parameter $SP_{WB}$ into the NV memory 120, for further use by the memory controller 100. For example, if the host device 50 supports the associated control of the write booster function, the memory controller 110 may operate according to the working flow shown in FIG. 3, to selectively set the aforementioned at least one initial value of the aforementioned at least one write booster static parameter $SP_{WB}$ as requested by the host device 50 and/or adjust the aforementioned at least one write booster static parameter $SP_{WB}$; otherwise, the memory controller 110 may automatically set the aforementioned at least one initial value of the aforementioned at least one write booster static parameter $SP_{WB}$ according the aforementioned at least one default value by itself, without relying on the host device 50.

For the case that the host device 50 does not support the associated control of the write booster function, the memory controller 110 may set the aforementioned at least one write booster static parameter $SP_{WB}$ of the write booster function of the memory device 100, having no need to rely on any control regarding the write booster function by the host device 50. For example, the memory controller 110 may set the aforementioned at least one write booster static parameter $SP_{WB}$ of the write booster function of the memory device 100, without receiving any host request regarding the write booster function from the host device 50.

In Step S32, the memory controller 110 may perform device initialization corresponding to at least one initialization phase of the memory device 100. The aforementioned at least one initialization phase may comprise a first initialization phase such as the UIC/UTP initialization phase, and comprise at least one other initialization phase posterior to the first initialization phase, such as the Application Layer initialization phase. In addition, the memory controller 110 may perform the hardware initialization and establish a link between the host device 50 and the memory controller 100 in the first initialization phase (e.g., the UIC/UTP initialization phase), and perform other initialization (e.g., the FTL initialization of the aforementioned at least one FTL control module and the NV memory initialization of the plurality of NV memory elements 122-1, 122-2, . . . and 122-N within the NV memory 120) in the aforementioned at least one other initialization phase (e.g., the Application Layer initialization phase), for controlling the memory device 100 to complete the device initialization corresponding to the aforementioned at least one initialization phase. For example, no matter whether the host device 50 supports the associated control of the write booster function or not, the memory controller 110 may operate according to the working flow shown in FIG. 4, to complete the device initialization corresponding to the aforementioned at least one initialization phase.

In Step S33, after completing the device initialization corresponding to the aforementioned at least one initialization phase (labeled "Completion of device initialization" for brevity), the memory controller 110 may perform at least one adaptive flag-setting operation, for setting at least one write booster flag among the plurality of write booster flags of the write booster function. For example, the aforementioned at least one write booster flag may comprise a first write booster flag (e.g., the flag fWriteBoosterEn) acting as a write booster switch of the write booster function, a second write booster flag (e.g., the flag fWriteBoosterBufferFlushEn) acting as a write booster flush switch of the write booster function, and a third write booster flag (e.g., the flag fWriteBoosterBufferFlushDuringHibernate) acting as a write booster hibernate-state-flush switch of the write booster function, and the aforementioned at least one adaptive flag-setting operation may comprise:

(1) the memory controller 110 may set the first write booster flag (e.g., the flag fWriteBoosterEn) to enable the write booster function by default;

(2) the memory controller 110 may set the second write booster flag (e.g., the flag fWriteBoosterBufferFlushEn) to enable buffer flushing of the write booster function by default; and (3) the memory controller 110 may set the third write booster flag (e.g., the flag fWriteBoosterBufferFlushDuringHibernate) to enable hibernate-state buffer flushing of the write booster function by default;

but the present invention is not limited thereto. For example, if the host device 50 supports the associated control of the write booster function, the memory controller 110 may set the respective initial values of the first write booster flag (e.g., the flag fWriteBoosterEn), the second write booster flag (e.g., the flag fWriteBoosterBufferFlushEn) and the third write booster flag (e.g., the flag fWriteBoosterBufferFlushDuringHibernate) according to at least one host request regarding the write booster function from the host device 50.

More particularly, for the case that the host device 50 does not support the associated control of the write booster function, the memory controller 110 may set the first write booster flag (e.g., the flag fWriteBoosterEn) to enable the write booster function by default, having no need to rely on any control regarding the write booster function by the host device 50. For example, the memory controller 110 may set the first write booster flag (e.g., the flag fWriteBoosterEn) to enable the write booster function by default, without receiving any host request regarding the write booster function from the host device 50. In addition, the memory controller 110 may set the second write booster flag (e.g., the flag fWriteBoosterBufferFlushEn) to enable the aforementioned buffer flushing of the write booster function by default, having no need to rely on any control regarding the write booster function by the host device 50. For example, the memory controller 110 may set the memory controller 110 may set the second write booster flag (e.g., the flag fWriteBoosterBufferFlushEn) to enable the aforementioned buffer flushing of the write booster function by default, without receiving any host request regarding the write booster function from the host device 50. Additionally, the memory controller 110 may set the third write booster flag (e.g., the flag fWriteBoosterBufferFlushDuringHibernate) to enable the aforementioned hibernate-state buffer flushing of the write booster function by default, having no need to rely on any control regarding the write booster function by the host device 50. For example, the memory controller 110 may set the third write booster flag (e.g., the flag fWriteBoosterBufferFlushDuringHibernate) to enable the aforementioned hibernate-state buffer flushing of the write booster function by default, without receiving any host request regarding the write booster function from the host device 50.

For better comprehension, the method may be illustrated with the working flow shown in FIG. 5, but the present invention is not limited thereto. According to some embodiments, one or more steps may be added, deleted, or changed in the working flow shown in FIG. 5. For example, the memory controller 110 may enter the device initialization completion phase when the device initialization of the memory device 100 is completed as shown in the working flow shown in FIG. 4, and execute Step S33 multiple times in the device initialization completion phase as shown in the working flow shown in FIG. 4. More particularly, if the host device 50 supports the associated control of the write booster function, the memory controller 110 may selectively enable or disable the write booster function by setting the plurality of write booster flags to be { 1, 1, 1} or {0, 0, 0} as requested by the host device 50 when executing Step S33 the first time after the latest power-on event of the memory device 100, and further execute Step S33 multiple times to adaptively adjust the plurality of write booster flags during runtime of the memory device 100, in order to optimize the overall performance of the memory device 100; otherwise, the memory controller 110 may automatically enable the write booster function by setting the plurality of write booster flags to be {1, 1, 1} when executing Step S33 the first time after the latest power-on event of the memory device 100, in order to enhance the write performance, and further execute Step S33 multiple times to adaptively adjust the plurality of write booster flags during runtime of the memory device 100, in order to optimize the overall performance of the memory device 100. For brevity, similar descriptions for these embodiments are not repeated in detail here.

According to some embodiments, the host device 50 may represent any of various host devices {50} corresponding to various UFS platforms with different capabilities, such as the host device #1, the host device #2, etc. For example, when the transmission interface circuit 118 within the memory controller 110 is coupled to the host device #1 (e.g., the host device 50 that does not support the associated control of the write booster function), the memory controller 110 may set the first write booster flag (e.g., the flag fWriteBoosterEn) to enable the write booster function by default. For another example, when the transmission interface circuit 118 within the memory controller 110 is coupled to the host device #2 (e.g., the host device 50 that supports the associated control of the write booster function), the memory controller 110 may set the first write booster flag (e.g., the flag fWriteBoosterEn) to enable the write booster function according to at least one host request regarding the write booster function from the host device #2. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access management of a memory device in a predetermined communications architecture with aid of automatic parameter setting, the method being applied to a memory controller of the memory device, the memory device comprising the memory controller and a non-volatile (NV) memory, the NV memory comprising at least one NV memory element, the at least one NV memory element comprising a plurality of blocks, the method comprising:
utilizing the memory controller to set at least one write booster static parameter of a write booster function of the memory device, for setting up a write booster buffer provided in the write booster function of the memory device, having no need to rely on any control regarding the write booster function by a host device;
utilizing the memory controller to perform device initialization corresponding to at least one initialization phase of the memory device, for selectively operating with the write booster buffer after completing the device initialization corresponding to the at least one initialization phase; and after completing the device initialization corresponding to the at least one initialization phase, performing at least one adaptive flag-setting operation regarding the write booster buffer, for setting at least one write booster flag among a plurality of write booster flags of the write booster function, wherein the at least one write booster flag comprises a first write booster flag acting as a write booster switch of the write booster function, and the at least one adaptive flag-setting operation comprises:
setting the first write booster flag to enable the write booster function by default, having no need to rely on any control regarding the write booster function by the host device.

2. The method of claim 1, wherein utilizing the memory controller to set the at least one write booster static parameter of the write booster function of the memory device further comprises:
utilizing the memory controller to set the at least one write booster static parameter of the write booster function of the memory device, without receiving any host request regarding the write booster function from the host device.

3. The method of claim 1, wherein utilizing the memory controller to set the at least one write booster static parameter of the write booster function of the memory device further comprises:
utilizing the memory controller to set the at least one write booster static parameter of the write booster function of the memory device, and save the at least one write booster static parameter into the NV memory, for further use by the memory controller.

4. The method of claim 1, wherein setting the first write booster flag to enable the write booster function by default further comprises:
setting the first write booster flag to enable the write booster function by default, without receiving any host request regarding the write booster function from the host device.

5. The method of claim 1, wherein the at least one write booster flag further comprises a second write booster flag acting as a write booster flush switch of the write booster function, and the at least one adaptive flag-setting operation further comprises:
setting the second write booster flag to enable buffer flushing of the write booster function by default.

6. The method of claim 5, wherein setting the second write booster flag to enable said buffer flushing of the write booster function by default further comprises:
setting the second write booster flag to enable said buffer flushing of the write booster function by default, having no need to rely on any control regarding the write booster function by the host device.

7. The method of claim 5, wherein setting the second write booster flag to enable said buffer flushing of the write booster function by default further comprises:
setting the second write booster flag to enable said buffer flushing of the write booster function by default, without receiving any host request regarding the write booster function from the host device.

8. The method of claim 1, wherein the at least one initialization phase comprises a first initialization phase and at least one other initialization phase posterior to the first initialization phase; and the memory controller is arranged to perform hardware initialization in the first initialization phase, and is arranged to perform other initialization in the at least one other initialization phase, for controlling the memory device to complete the device initialization corresponding to the at least one initialization phase.

9. The method of claim 8, wherein the memory controller is arranged to establish a link between the host device and the memory controller in the first initialization phase.

10. The method of claim 1, wherein in response to a transmission interface circuit within the memory controller being coupled to the host device, the memory controller is arranged to set the first write booster flag to enable the write booster function by default; and in response to the transmission interface circuit within the memory controller being coupled to another host device, the memory controller is arranged to set the first write booster flag to enable the write booster function according to at least one host request regarding the write booster function from the other host device.

11. A memory controller of a memory device, the memory device comprising the memory controller and a non-volatile (NV) memory, the NV memory comprising at least one NV memory element, the at least one NV memory element comprising a plurality of blocks, the memory controller comprising:

a processing circuit, arranged to control the memory controller according to a plurality of host commands from a host device, to allow the host device to access the NV memory through the memory controller, wherein the processing circuit is arranged to perform access management of the memory device in a predetermined communications architecture with aid of automatic parameter setting;

wherein:

the memory controller sets at least one write booster static parameter of a write booster function of the memory device, for setting up a write booster buffer provided in the write booster function of the memory device, having no need to rely on any control regarding the write booster function by the host device;

the memory controller performs device initialization corresponding to at least one initialization phase of the memory device, for selectively operating with the write booster buffer after completing the device initialization corresponding to the at least one initialization phase; and after completing the device initialization corresponding to the at least one initialization phase, the memory controller performs at least one adaptive flag-setting operation regarding the write booster buffer, for setting at least one write booster flag among a plurality of write booster flags of the write booster function, wherein the at least one write booster flag comprises a first write booster flag acting as a write booster switch of the write booster function, and the at least one adaptive flag-setting operation comprises:

setting the first write booster flag to enable the write booster function by default, having no need to rely on any control regarding the write booster function by the host device.

12. The memory device comprising the memory controller of claim 11, wherein the memory device comprises:

the NV memory, configured to store information; and the memory controller, coupled to the NV memory, configured to control operations of the memory device.

13. An electronic device comprising the memory device of claim 12, and further comprising:

the host device, coupled to the memory device, wherein the host device comprises:

at least one processor, arranged for controlling operations of the host device; and a power supply circuit, coupled to the at least one processor, arranged for providing power to the at least one processor and the memory device;

wherein the memory device provides the host device with storage space.

\* \* \* \* \*